No. 733,128. PATENTED JULY 7, 1903.
E. E. BENNETT & A. C. ALLEN.
FRUIT GATHERER.
APPLICATION FILED FEB. 10, 1903.
NO MODEL. 2 SHEETS—SHEET 2.
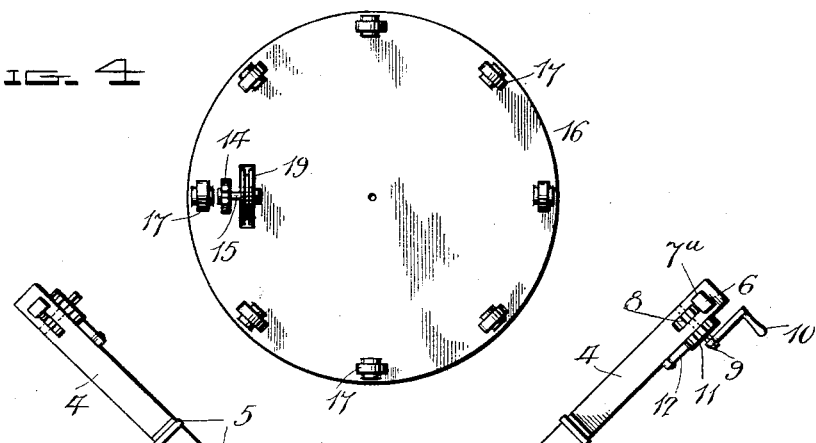
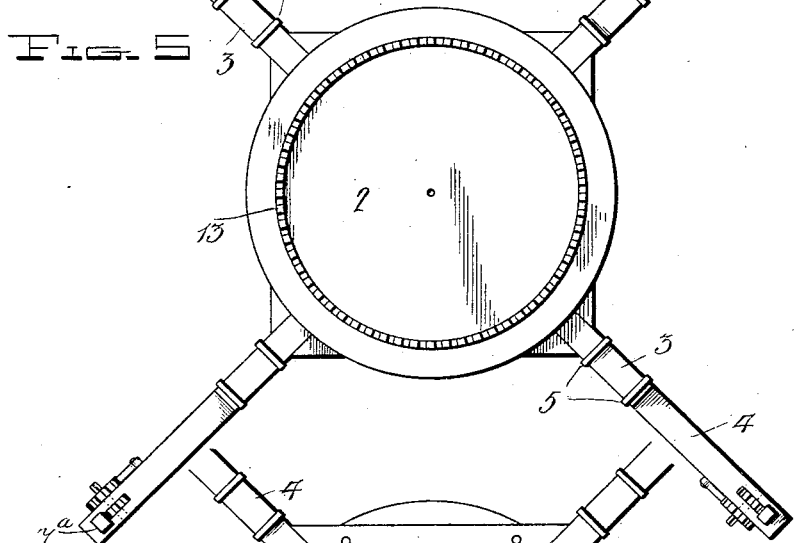
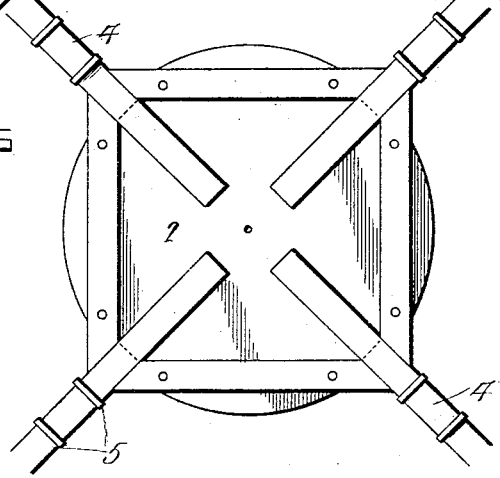
Witnesses
Inventors
Elmer Ellsworth Bennett,
Arthur Chambers Allen,
By Charles D. Pennebaker,
Attorney No. 733,128. Patented July 7, 1903.

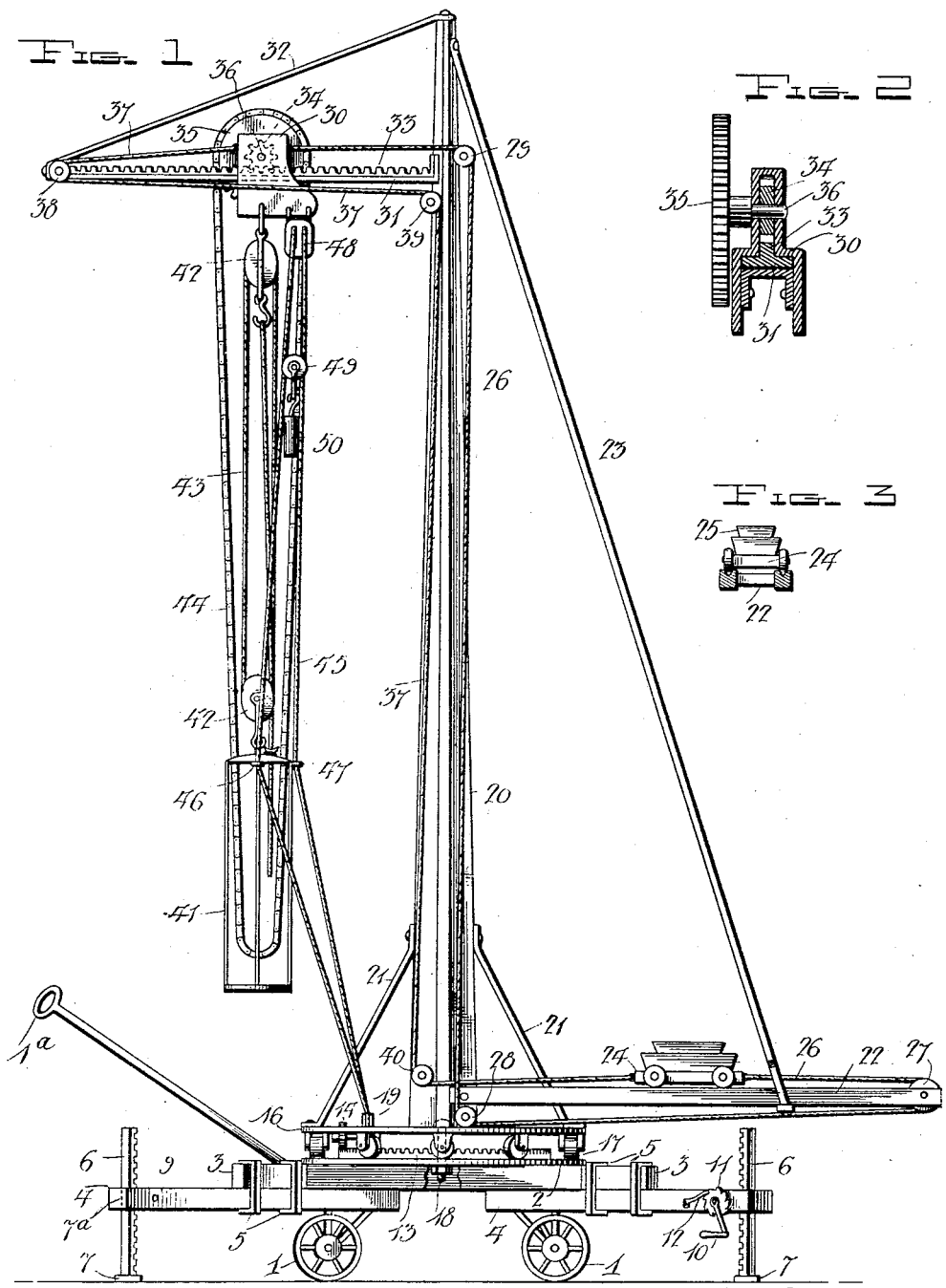

UNITED STATES PATENT OFFICE.

ELMER ELLSWORTH BENNETT AND ARTHUR CHAMBERS ALLEN, OF BOWLING GREEN, KENTUCKY.

FRUIT-GATHERER.

SPECIFICATION forming part of Letters Patent No. 733,128, dated July 7, 1903.

Application filed February 10, 1903. Serial No. 142,747. (No model.)

*To all whom it may concern:*

Be it known that we, ELMER ELLSWORTH BENNETT and ARTHUR CHAMBERS ALLEN, citizens of the United States, residing at Bowling Green, in the county of Warren and State of Kentucky, have invented certain new and useful Improvements in Fruit-Gatherers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to fruit-gatherers, and has for its object the production of an apparatus by means of which the operator may hoist or lower himself and at the same time move the basket or carriage in which he is suspended either toward or from a central support or circularly into the position most advantageous to reach and gather fruit from a tree.

A further object of our invention is to provide weight bearing and transporting devices as part of the apparatus and means for actuating the weight toward or from the central support in correspondence with the horizontal movement of the basket containing the operator in order to balance his weight and prevent the apparatus from tilting.

A still further object is to supply devices for extending and leveling the base or platform.

We accomplish the objects stated by constructing and assembling the parts illustrated in the accompanying drawings, of which—

Figure 1 is a side view of our invention as a whole. Fig. 2 represents an edge view of the main sprocket-wheel and a vertical section of the rack, pinion, and housing thereof for moving the basket horizontally. Fig. 3 is an end view of the truck bearing the balance-weight and a cross-section of one form of track for supporting and guiding the truck. Fig. 4 is a top plan view of the turn-table. Fig. 5 is a top plan of the platform of the apparatus, and Fig. 6 is a plan view of the platform from below.

In Figs. 5 and 6 are shown the extensible arms of the platform, by means of which the base of support of the whole is enlarged, as hereinafter described.

Like numbers designate like parts in the several views.

Considering the drawings, numeral 1 marks suitable truck-wheels, supporting the apparatus and allowing it to be drawn from place to place by means of the tongue $1^a$ and by hand or horse power.

Numeral 2 designates the platform, of any desired shape, usually circular, (see Figs. 4, 5, and 6,) and radially-projecting beams or arms 3 are secured to the lower surface of the platform at quadrantal points. Below the fixed arms are placed extension-arms 4, sliding outwardly and inwardly through links 5, which are attached to the fixed arms and embrace also the movable arms. At the outer extremity of each extension-arm 4 is a vertically-disposed geared bar 6, having a presser-foot 7. The geared bar passes through a passage $7^a$ in the arm (see Fig. 1) and may be raised or lowered by the engaged pinion 8, fixed on a transverse shaft 9 and turned by the detachable hand-crank 10. The office of extension-arms 4 is to extend the base of the apparatus, and the purpose of the vertical geared bars 6 and their feet is to enable the platform to be leveled with its base extended, as stated, whatever may be the inequalities of the ground surface directly beneath the ends of arms 4—that is to say, one bar may need to be run down farther than another to press upon the ground beneath and keep a level platform, because the ground is lower at that point. To hold the bar down with its foot pressing against the earth, we provide a ratchet-wheel 11 and pawl 12, as shown in Fig. 1. We do not, however, confine ourselves to the devices described for raising and lowering or securing the vertical bars.

On the upper surface of platform 2 is fixed the geared circle 13, and engaging it is a pinion 14 on a short shaft 15, journaled on the lower surface of the turn-table 16. The turn-table is supported by a series of rollers or wheels 17, which run upon the platform, and a center pin 18, passing through turn-table and platform, constitutes the center of rotation and keeps the two parts together. It will be noted in Fig. 4 that the shaft 15 is provided with a rope drum or pulley 19, and this drum will be again referred to.

Number 20 designates the mast or center pole, usually a built-up spar of very strong construction and fastened securely to the middle of the turn-table. Suitably-inclined braces 21, in any number, also connect the mast with the turn-table and reinforce its rigidity. A track-boom 22 has one end fastened to the mast, from which it projects outwardly at right angles, its outer end being supported by the stay 23, inclining downwardly and outwardly from the mast-head. Boom 22 therefore swings around with the turn-table and mast. The top of the boom affords a grooved track on which a small truck 24 runs out and back from mast 20 and bears the balance-weight 25 of any necessary amount, depending on the weight of the customary operator. To the outer end of the balance-truck 24 a cable 26 is attached, and it extends thence around the grooved pulley 27 in the outermost end of the boom 22 and horizontally back to the foot of the mast. Then it passes around another grooved pulley 28 and takes a vertical direction up the mast until it reaches a third grooved pulley 29, from which it takes again a horizontal direction and is finally secured to housing 30. Housing 30 is a movable part. It slides out and in with respect to the mast and is supported by the upper boom 31, projecting at right angles near the top of the mast in substantially the same vertical plane with the lower boom 22. An inclined stay 32 joins the mast-head and top of boom 31. Along the upper surface of boom 31 a geared rack 33 is fixed, and a pinion 34 within the housing (see Fig. 2) engages the rack. The pinion is turned by the sprocket-wheel 35 on same shaft 36 with the pinion, and it is thought to be clear that the housing may be thus moved toward or from the mast on the boom. In Fig. 1 it will be noted that a cable 37, having one end secured to the housing, leads about a grooved pulley 38 at the extremity of boom 31, thence back to the mast horizontally, around pulley 39, and vertically downward, where after turning about pulley 40 at the foot of the mast the cable 37 is led toward and fastened to the inner end of the balance-weight truck 24. By means of the arrangement of pulleys and cables described the housing and balance-weight truck are moved from and to the mast together, and the weight of the operator, who stands in basket 41, suspended from housing 30 by block 42 and tackle 43, is compensated on the opposite side of the mast whatever may be his distance from the mast. Sprocket-chain 44 turns sprocket-wheel 35, and consequently pinion 34, thereby moving the housing in or out, and the operator raises and lowers himself by the blocks and tackle. We do not limit ourselves to the peculiar form of basket and tackle shown, but may modify such forms when desired.

We intend that the operator shall be able without needless exertion to raise or lower himself and move his position outwardly or inwardly to reach the fruit growing on a tree or to move himself in a circular direction. The hoisting and radially-moving mechanisms we have described. To rotate the turn-table and change his place circularly, he draws upon the cord 45, which takes a turn or two about drum 19, above mentioned, and is passed through eyes 46 and 47, attached to the basket, through the double block 48, hanging from the housing, as shown, and its terminal loop engages the grooved pulley 49, to which is attached weight 50. Cord 45 is led to the basket to be always in reach of the operator whether he is out or in on the boom 31, and the weight 50 keeps the cord always taut. The terminal loop of the cord, which engages pulley 49, is obviously longest when the housing is near the mast and shortest when it approaches the tip of the boom. By drawing on cord 45 the operator turns drum 19, and consequently pinion 14, either way at will, and the engagement of the pinion and the circular gear 13 of platform 2 actuates the turn-table.

We are aware that derricks and cranes have been constructed having extended ways for traveling balance-weights moved toward or from the central support in correspondence with the position of the load, and we do not claim that feature.

What we claim is—

1. In a fruit-gatherer, the combination of a platform, a mast erected thereon, a track-boom projecting near the foot of the mast, a weighted truck movable upon said track-boom, an upper boom projecting near the head of the mast, a housing movable along the said upper boom, cables connecting said housing and truck and pulleys directing the cables whereby movement of the housing along the upper boom correspondingly actuates the said truck along the track-boom, a basket, hoisting-tackle and devices suspending the basket from said housing and arranged to be operated by the occupant of the basket, mechanism constructed and arranged to move the said housing along the upper boom, and means accessible to the occupant of said basket in any position of the basket adapted to operate and control said housing-moving mechanism, substantially as described.

2. In a fruit-gatherer, the combination of a platform having extension-arms, vertical leveling-bars located at the outer ends of the said arms, devices for adjusting and securing the vertical bars, a mast erected on the said platform, a track-boom projecting near the foot of the mast, a weighted truck movable upon said track-boom, an upper boom projecting near the head of the mast, a housing movable along the said upper boom, cables connecting said housing and truck and pulleys directing the cables whereby movement of the housing along the upper boom correspondingly actuates the said truck along the track-boom, a basket, hoisting-tackle and devices suspending the basket from said housing and arranged to be operated by the occupant of the basket, mechanism constructed and arranged to move the said housing along the upper boom, and means accessible to the occupant of said basket in any position of the basket adapted to operate and control said housing-moving mechanism, substantially as described.

3. In a fruit-gatherer, the combination of a platform and means for leveling it, a turn-table on said platform, a mast erected on the said turn-table, a suspended basket, hoisting-tackle and devices arranged to be operated by the occupant of said basket for raising and lowering the basket, mechanism operated and controlled from the basket adapted to move it toward or from said mast, turn-table-rotating devices, and extensible connections constructed to actuate the said turn-table-rotating devices from any position of the basket, substantially as described.

4. In a fruit-gatherer, the combination of a platform having extension-arms, vertical leveling-bars located at the outer ends of the said arms, devices for adjusting and securing the vertical bars, a turn-table on said platform, a mast erected on said turn-table, a track-boom projecting near the foot of the mast, a weighted truck movable upon said track-boom, an upper boom projecting near the head of the mast, a housing movable along said upper boom, cables connecting said housing and truck and pulleys directing the cables whereby movement of the housing along the upper boom correspondingly actuates the said truck along the track-boom, a basket, hoisting-tackle and devices suspending the basket from said housing and arranged to be operated by the occupant of the basket, mechanism constructed and arranged to move the said housing along the upper boom, means accessible to the occupant of said basket in any position of the basket adapted to operate and control said housing-moving mechanism, turn-table-rotating devices, and extensible connections constructed to actuate the said turn-table-rotating devices from any position of the basket, substantially as described.

In testimony whereof we affix our signatures in presence of two witnesses.

ELMER ELLSWORTH BENNETT.
ARTHUR CHAMBERS ALLEN.

Witnesses:
  JNO. H. BLACKBURN,
  F. D. REARDON.